H. A. ZURBUCH.
MOLD FOR MAKING BLOCKS AND BRICKS.
APPLICATION FILED OCT. 6, 1908.

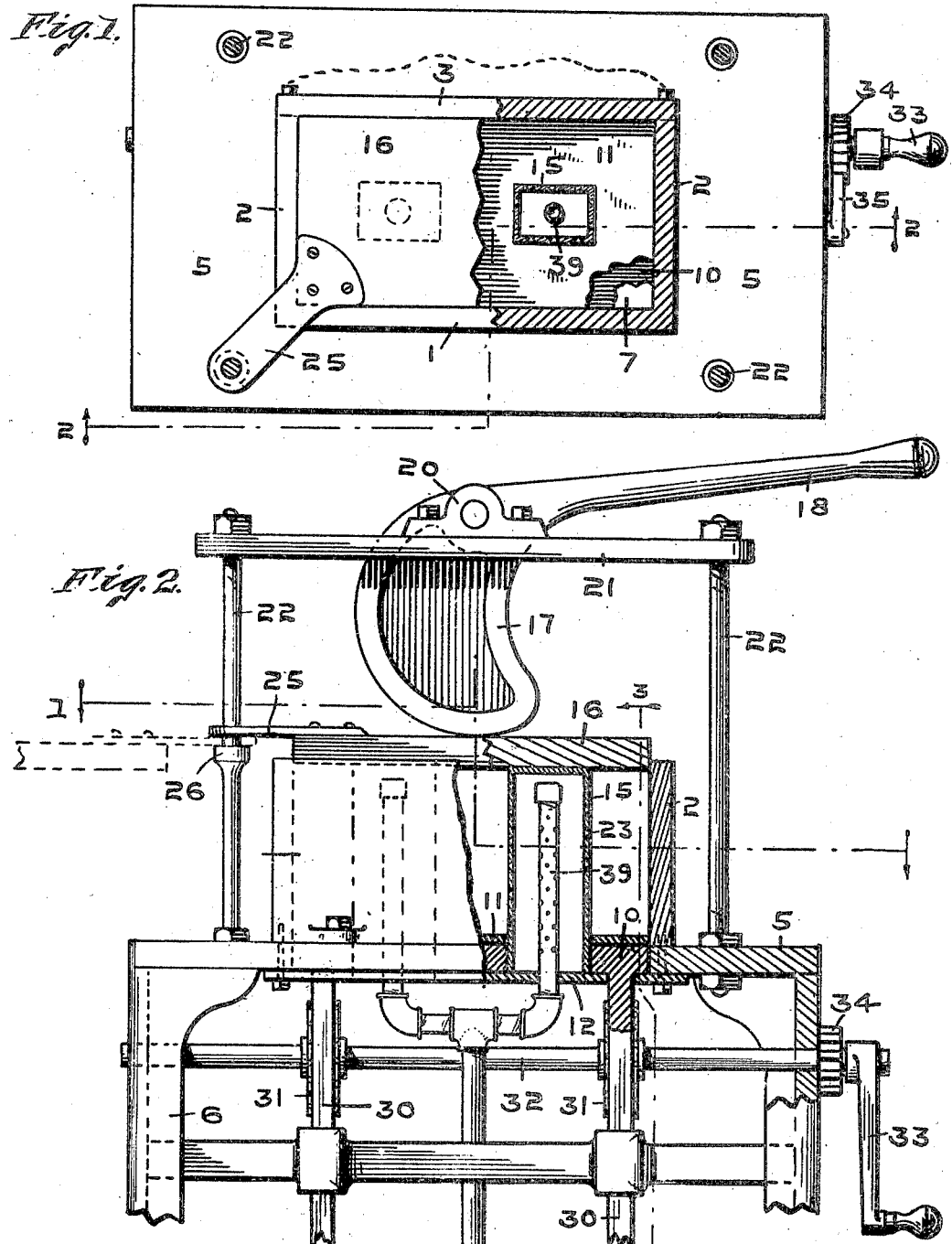

950,811.

Patented Mar. 1, 1910.
2 SHEETS—SHEET 2.

WITNESSES:
L. B. Woerner
Wm Hurte.

INVENTOR
Henry A. Zurbuch
By Minturn & Woerner
ATT'YS.

UNITED STATES PATENT OFFICE.

HENRY A. ZURBUCH, OF MARION, INDIANA.

MOLD FOR MAKING BLOCKS AND BRICKS.

950,811.　　　　　　Specification of Letters Patent.　　　Patented Mar. 1, 1910.

Application filed October 6, 1908. Serial No. 456,494.

*To all whom it may concern:*

Be it known that I, HENRY A. ZURBUCH, a citizen of the United States, residing at Marion, in the county of Grant and State of Indiana, have invented certain new and useful Improvements in Molds for Making Blocks and Bricks, of which the following is a specification.

This invention relates to a mold employed for making cement blocks by the "wet process" method wherein the cement is sufficiently diluted with water to enable same to be poured into the mold or flask.

The object of the invention consists in providing a mold for making cement blocks wherein the removal of the surplus water, employed in the initial step of making the block, may be hastened.

The nature and operation of the invention will be better understood from the accompanying drawings, forming a part hereof, in which—

Figure 3:
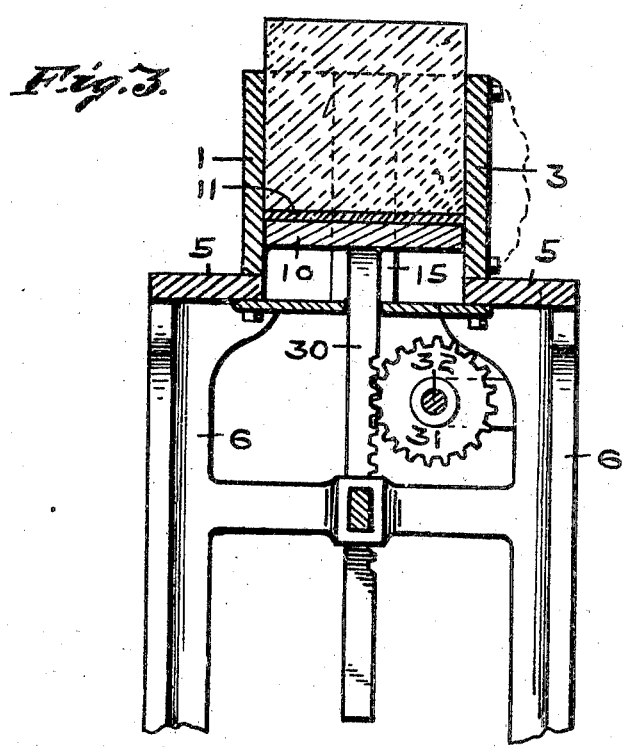
Figure 4:
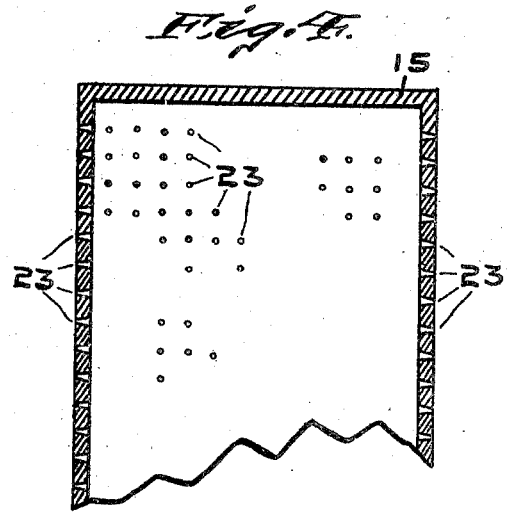

Figure 1 is a view partly in top plan and partly in section of my improved mold for making cement blocks on the dotted line 1—1 in Fig. 2. Fig. 2 is a view partly in side elevation and partly in section of the mold on the dotted line 2—2 in Fig. 1. Fig. 3 is a transverse sectional view on the line 3—3 in Fig. 2. Fig. 4 is a fragmentary detail sectional view, on an enlarged scale, of the upper end of one of the drain tubes that form a core in the finished cement block.

In the drawings 1 represents the rear wall, 2, 2 the end walls, and 3 the front wall of the mold or flask in which the cement block is molded. The mold or flask is rigidly secured to the table 5 which is supported by suitable legs 6. The table 5 is provided with a central aperture 7 which is of a size to correspond with the internal dimension of the mold. The mold is provided with a movable ejector base plate 10 which is susceptible of being moved vertically within the mold to eject the finished block and its supporting pallet 11. The downward movement of the movable base 10 is limited by means of a plate 12 which is secured to the inner side of the table top 5. Arranged in a vertical manner within the mold is a pair of rectangularly formed hollow tubes 15 which are secured to the stationary plate 12, and the object of these tubes will be hereinafter described.

When making cement blocks by the wet process the cement is usually mixed with about thirty to thirty-three per cent. of water which brings the cement to a semi-liquid state enabling it to be poured into the mold. After the mold has been filled said mold is then covered with a pressure plate 16 which corresponds to the internal dimensions of said mold, and pressure is then applied by means of a cam 17 provided with a handle 18 by which sufficient leverage can be secured. The cam 17 is mounted in the bearing 20 which is secured to the plate 21 mounted in the standards 22 which engage the top 5. The pressure so imparted to the cement removes the possibility of air bubbles remaining in the block and also accelerates the removal of the surplus water from the block. The compression on the cement from above forces the water to travel in the direction of the discharge openings which consist of a plurality of minute openings 23 in the rectangular hollow tubes 15. The construction and arrangement of said perforations are best shown in Fig. 4 of the drawings. The water after entering the tubes 15 is allowed to flow out at the lower end. After the pressure has been prolonged for sufficient time to remove so much of the surplus water to enable the cement to solidify, the block is then ready to be removed from the mold. The removal of the block is accomplished by raising the handle 18 to remove the cam 17 from the pressure plate 16 thus enabling the latter to be elevated sufficiently to be freed from the upper end of the mold when it is swung to one side out of the way as shown by the dotted position in Fig. 2. The pressure plate 16 is provided at one corner with an ear 25 which engages one of the standards 22 whereby a pivot is formed from which the plate 16 may be swung. The standard 22 is provided with a shoulder 26 whereby the plate 16 is held approximately on a level with the top of the mold when the former is swung to one side from the latter. The molded block is now ready to be moved vertically to enable it to be freed from the mold and this removal of the block is accomplished by means of the heretofore mentioned movable base 10. To force the said base to move vertically the same is provided with a pair of racks 30 which extend downwardly and are engaged by a pair of pinions 31 mounted on the shaft 32. This shaft is operated by means of a hand crank 33, and by means of the ratchet 34 and the pawl 35 the movable base 10 can be held at any elevation desired. In case the block that is being molded has an irregular surface, known as a faced block, it becomes necessary to first remove the front wall 3 of the mold before elevating the block by means of the movable base 10.

As the water is being forced out of the cement into the tubes 15 through the perforations 23 small particles of cement may gather in said perforations which would have a tendency to clog said perforations and impede the movement of the water. To keep the interior walls of the tubes 15 clean and the perforations 23 open, I provide a system for spraying and flushing the interior of said tubes with water. This is accomplished by means of a vertically disposed pipe 39 in each of the tubes 15, and said pipes are provided with numerous perforations through which the water is discharged against the internal walls of the tubes 15. The tubes are flushed when it is deemed necessary.

It will be understood that the invention proper relates to the mold, the surrounding mechanism being merely intended to show the mold in operation.

Having thus fully described my said invention, what I desire to secure by Letters Patent, is—

1. A mold for making blocks comprising a flask, a plurality of perforated drain tubes arranged within said flask, and means arranged within said drain tubes to flush the internal walls of said tubes.

2. A mold for making blocks comprising a flask, and a plurality of drain tubes having perforations arranged within said flask, said perforations having a diameter of not more than three-sixteenths of an inch at the external surface of said tubes and increasing in diameter as they extend away from said surface.

In witness whereof, I have hereunto set my hand and seal at Indianapolis, Indiana, this 25th day of September, A. D. one thousand nine hundred and eight.

HENRY A. ZURBUCH. [L. S.]

Witnesses:
F. W. WOERNER,
L. B. WOERNER.